(12) United States Patent
Martin et al.

(10) Patent No.: US 11,624,440 B2
(45) Date of Patent: Apr. 11, 2023

(54) SEAL

(71) Applicant: Dürr Systems AG, Bietigheim-Bissingen (DE)

(72) Inventors: Herbert Martin, Weinstadt (DE); Martin Stiegler, Beilstein (DE); Hannes Mayer, Ludwigsburg (DE); Ralf Schäfer, Marbach (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 139 days.

(21) Appl. No.: 16/960,571

(22) PCT Filed: Jan. 8, 2019

(86) PCT No.: PCT/EP2019/050326
§ 371 (c)(1),
(2) Date: Jul. 8, 2020

(87) PCT Pub. No.: WO2019/137904
PCT Pub. Date: Jul. 18, 2019

(65) Prior Publication Data
US 2020/0393045 A1    Dec. 17, 2020

(30) Foreign Application Priority Data

Jan. 12, 2018    (DE) .................... 10 2018 100 637.3

(51) Int. Cl.
*F16J 15/3248* (2016.01)
*F04B 53/14* (2006.01)
*F04B 53/16* (2006.01)

(52) U.S. Cl.
CPC ........... *F16J 15/3248* (2013.01); *F04B 53/14* (2013.01); *F04B 53/16* (2013.01)

(58) Field of Classification Search
CPC ....... F04B 1/0448; F04B 53/02; F16J 15/186; F16J 15/3248; F16J 15/325
See application file for complete search history.

(56) References Cited

U.S. PATENT DOCUMENTS 3,511,511 A * 5/1970 Voitik .................. F16J 15/3456
277/366
4,151,999 A    5/1979 Ringel et al.
(Continued)

FOREIGN PATENT DOCUMENTS

DE    2743376 A1    5/1978
DE    4403449 A1    8/1995
(Continued)

OTHER PUBLICATIONS

International Search Report and Written Opinion for PCT/EP2019/050326 dated Apr. 4, 2019 (13 pages; with English translation).

*Primary Examiner* — Grant Moubry
*Assistant Examiner* — Ruben Picon-Feliciano
(74) *Attorney, Agent, or Firm* — Bejin Bieneman PLC

(57) ABSTRACT

The disclosure concerns a seal, in particular a rod seal for sealing an axially movable rod in a guide cylinder, in particular a piston seal for a pneumatically, electrically or hydraulically driven coating agent pump for pumping coating agent, having an annular sealing element for sealingly resting on a circumferential surface of an axially movable rod, and having at least one elastic annular pretensioning element, the annular pretensioning element surrounding the annular sealing element radially on the outside and pretensioning it radially to the inside. The disclosure provides an annular seal base body which externally surrounds and holds the sealing element and the pretensioning element. In addition, the disclosure also comprises an inverted variant in which the seal is arranged in an annular groove in a lateral (Continued)

surface of a piston and lies sealingly against the cylinder running surface.

24 Claims, 6 Drawing Sheets

(56) References Cited

U.S. PATENT DOCUMENTS

| | | | |
|---|---|---|---|
| 6,217,029 B1 * | 4/2001 | Weiler | F16F 9/362 |
| | | | 277/434 |
| 2006/0024172 A1 | 2/2006 | Macal et al. | |
| 2007/0169621 A1 | 7/2007 | Okada et al. | |
| 2011/0298183 A1 | 12/2011 | Brandl | |
| 2014/0291936 A1 * | 10/2014 | Grimanis | F16J 15/3252 |
| | | | 277/306 |
| 2017/0152841 A1 | 6/2017 | Preuss et al. | |

FOREIGN PATENT DOCUMENTS

| | | |
|---|---|---|
| DE | 102005059926 A1 | 6/2007 |
| GB | 1085194 A | 9/1967 |
| WO | 2015144317 A1 | 10/2015 |

\* cited by examiner

SEAL

CROSS-REFERENCE TO RELATED APPLICATIONS

This application is a national stage of, and claims priority to, Patent Cooperation Treaty Application No. PCT/EP2019/050326, filed on Jan. 8, 2019, which application claims priority to German Application No. DE 10 2018 100 637.3, filed on Jan. 12, 2018, which applications are hereby incorporated herein by reference in their entireties.

BACKGROUND

The disclosure concerns a seal, in particular a rod seal for sealing an axially movable rod in a guide cylinder, in particular as a piston seal for a pneumatically, electrically or hydraulically driven coating agent pump for pumping coating agent.

From WO 2015/144317 A1, a pneumatically driven coating agent pump is known, which has several hydraulic cylinders for conveying the coating agent (e.g. paint), in each of which a delivery piston is axially displaceable. This poses the problem of sealing the outer surface of the displaceable delivery piston against the inner surface of the hydraulic cylinder. Ring seals are used for this sealing, which are only shown schematically in the above-mentioned patent application.

FIG. 8 shows a well-known example of a conventional seal 1 for sealing a rod 2 against a guide cylinder 3, whereby the seal 1 is distributed by the German company Parker Hannifin GmbH, for example. This well-known seal 1 essentially consists of a ring-shaped sealing element 4, which rests sealingly on the outer lateral surface of the rod 2, and a likewise ring-shaped pretensioning element 5, which surrounds the ring-shaped sealing element 4 radially on the outside and pretensions it radially inwards.

The disadvantage of this well-known seal 1 is, however, the only simple sealing effect, as the sealing element 4 is the only sealing point. This disadvantage is inherent in the design of the known seal 1 and therefore cannot be bypassed.

For the technical background of the disclosure, reference should also be made to DE 27 43 376 A1, US 2011/0 298 183 A1, US 2014/0 291 936 A1 and DE 10 2005 059 926 A1.

DETAILED DESCRIPTION

The seal according to the disclosure is preferably designed as a rod seal to seal an axially movable rod in a guide cylinder against the guide cylinder.

In a variant of the disclosure, the seal is thus arranged internally in an annular groove in a cylinder running surface of a guide cylinder (e.g. hydraulic cylinder) and is thus stationary, whereby the cylinder housing can be formed in several parts. The sealing element of the seal then lies sealingly against the outer surface of a rod (e.g. piston). The pretensioning element pretensions the sealing element in a radial direction towards the inside, whereby the sealing element is pressed against the outer surface of the piston.

For example, the seal according to the disclosure can be a piston seal that seals an axially displaceable delivery piston in a coating agent pump against the surrounding hydraulic cylinder. However, the disclosure is not limited to piston seals in coating agent pumps with regard to the field of application of the seal according to the disclosure.

In another, reversed variant of the disclosure, the seal is, on the other hand, arranged in an annular groove in the outer circumferential surface of a rod (e.g. piston) which is displaceable in a guide cylinder (e.g. hydraulic cylinder). The piston or the rod can be constructed in several parts. The sealing element of the seal then lies sealingly on the cylinder running surface of the guide cylinder. Here the pretensioning element can press the seal radially inwards into the annular groove. In addition, the pretensioning element can be supported between the radially outer sealing element on the one hand and a radially inner seal base body on the other hand, thereby pressing the sealing element elastically against the cylinder bore surface.

The seal according to the disclosure can therefore be fixed either on the outside in the outer surface of a sliding piston or on the inside in the cylinder running surface of a stationary guide cylinder.

Figure 8:
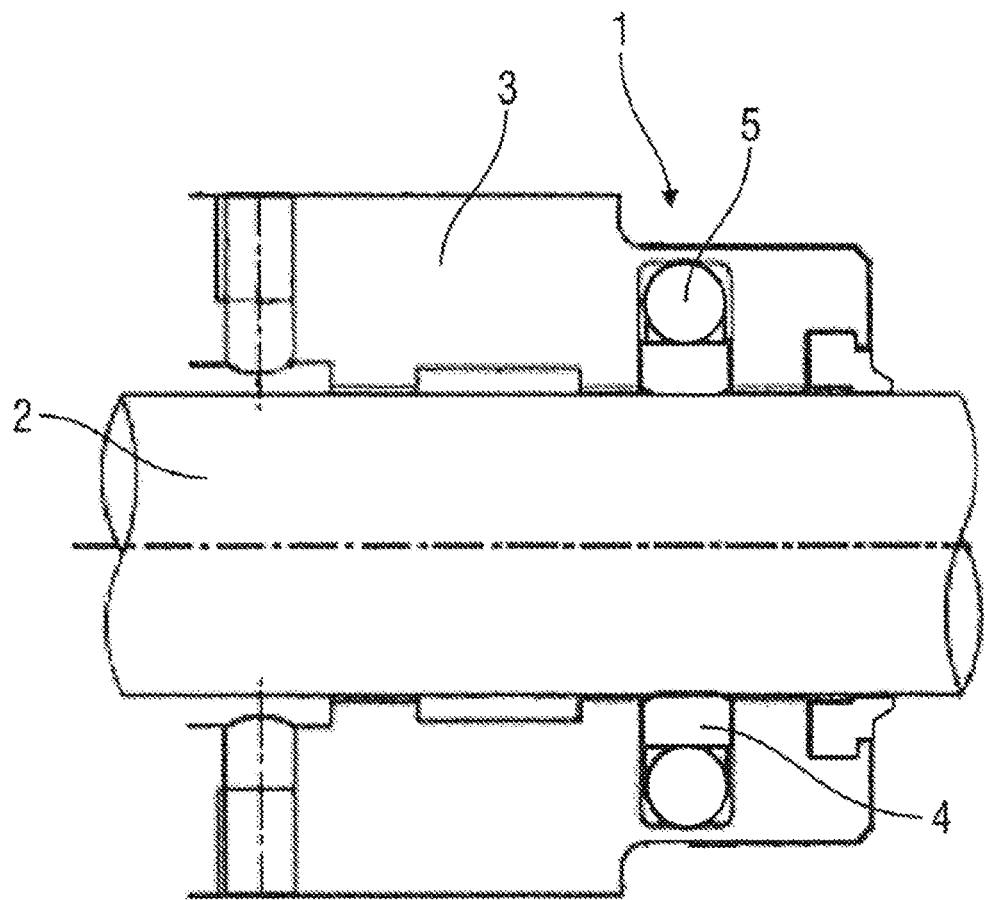

In accordance with the known seal described above in FIG. 8, the seal according to the disclosure also has at least one ring-shaped sealing element which, in the assembled state, rests sealingly on a lateral surface of an axially movable rod (e.g. piston).

With regard to the number of the annular sealing elements, there are various possibilities within the scope of the disclosure. For example, the seal according to the disclosure can have only one single sealing element. Preferably, however, the seal according to the disclosure contains two ring-shaped sealing elements to create a double-acting seal. The two sealing elements then lie axially next to each other. In addition, within the scope of the disclosure there is also the possibility of a larger number (e.g. 3, 4 or 5) of annular sealing elements in the seal according to the disclosure.

An elastic and annular pretensional element can be included that is radially on the outside to pretension radially on the inside.

If the seal according to the disclosure contains several annular sealing elements, a single pretensioning element may still be provided, which then acts jointly on the various annular sealing elements. Alternatively, however, there is also the possibility that an annular pretensioning element is assigned to each of the individual annular sealing elements.

The seal according to the disclosure is characterized by an annular seal base body, which surrounds and holds the at least one sealing element and the at least one pretensioning element radially on the outside.

In a preferred embodiment of the disclosure, the annular seal base body surrounds the sealing element and the pretensioning element on both sides in the axial direction, i.e. the sealing element and the pretensioning element are held on three sides, namely radially on the outside and on both sides in the axial direction. Alternatively, however, it is also possible for the basic seal base body to hold the sealing element and the pretensioning element on one side only in the axial direction.

However, in the preferred embodiment of the disclosure, the annular seal base body is substantially U-shaped in cross-section with two legs extending substantially radially and a radially outer base extending substantially axially. With respect to the radially extending legs, it should be noted that these do not have to be exactly radial, which is preferred. Rather, it is also possible that the radially extending legs of the U-shaped seal base body run at an acute angle to the radius.

The multi-part design of the seal according to the disclosure, with the sealing element and the separate pretensioning element, allows for the respective technical function of these components can be taken into account in the respective material selection for the pretensioning element and the sealing element.

It is therefore possible if the sealing element is made of a harder sealing material than the pretensioning element. This enables the technical realization of wear-resistant seals by using a relatively hard sealing material for the sealing element. In this way, the life time of the seal according to one possibility within the disclosure can be considerably increased compared to the known seals.

The separate pretensioning element ensures that the sealing element is always optimally pretensioned, which combines good sealing with low wear during operation. In addition, no manual adjustment of the seal is necessary, as the relatively hard sealing material of the sealing element means that only slight wear occurs. The optimum pretension of the sealing element by the pretensioning element also prevents the sealing element from being infiltrated by the fluid (e.g. coating agent) during operation.

In a variant of the disclosure, the ring-shaped sealing element is closed in a ring shape.

In another variant of the disclosure, however, the annular sealing element is slit, i.e. the sealing element is not closed in a ring shape but is interrupted by an axially continuous slit.

In the slotted variant of the annular sealing element, there are again different possibilities with regard to the arrangement and alignment of the slit. For example, the slit can run axially in the annular sealing element. Alternatively, it is possible for the slit in the annular sealing element to run at an angle in the circumferential direction, i.e. angled in the circumferential direction. Furthermore, there is also the possibility that the slit in the ringshaped sealing element runs in steps, in particular with two axially outer and axially running slit sections and a central slit section running in the circumferential direction.

In the slotted version of the ring-shaped sealing element with the stepped course of the slit, the sealing element can deform during operation as a function of an axial pressure load on the seal. The sealing element is preferably designed in such a way that the free ends of the annular slotted sealing element leave a gap free in the area of the slit section running in the circumferential direction without an axial pressure load on the seal, so that no sealing effect is achieved in the axial direction. If the seal is subjected to an axial compressive load, the free ends of the slotted annular sealing element are, however, compressed in the axial direction and then lie sealingly one on top of the other.

It has already been briefly mentioned above that within the scope of the disclosure it is also possible that the seal base body contains several annular sealing elements which then lie next to each other in the axial direction in the seal base body. If these sealing elements are slit in the manner described above, the annular sealing elements should be rotated relative to each other in such a way that the slits of the axially adjacent sealing elements lie in different angular positions. This rotation of the adjacent sealing elements prevents the respective fluid (e.g. coating agent) from passing in the axial direction through the slits which are overlapping each other.

It should also be mentioned that in the assembled state the seal base body preferably lies in a ring-shaped receiving groove, for example on the inner wall of a hydraulic cylinder. For static sealing of the seal base body against the annular receiving groove, the seal base body can have at least one protruding sealing lip, which is preferably formed on an axial end face of the seal base body. Preferably, at least one axially protruding sealing lip is arranged on each of the two opposite end faces of the seal base body. In the preferred examples of the disclosure, however, two concentric sealing lips are formed on both sides.

In general, it should be mentioned that the seal according to the disclosure is preferably a dynamic seal, which is preferably designed for translational movements of the sealing partners (e.g. piston and hydraulic cylinder).

Furthermore, it should be mentioned that the sealing element, the pretensioning element and/or the seal base body preferably consist of an elastic material.

With regard to the choice of material for the sealing element, the pretensioning element and the seal base body, there are many possibilities within the scope of the disclosure. Possible materials include in particular polytetrafluoroethylene (PTFE), polyethylene (PE), polyurethane (PU), rubber, acrylonitrile butadiene rubber, polyoxymethylene (POM), ethylene-propylene-diene rubber, polyketone and polyetherimide. However, with regard to the materials for the sealing element, the pretensioning element and the seal base body, the disclosure is not limited to the above-mentioned materials, but can in principle also be realized with other materials. It should be noted here that the sealing element preferably consists of a harder material than the pretensioning element and/or the seal base body.

Furthermore, it should be mentioned that the sealing element, the pretensioning element and/or the seal base body preferably consist of a sealing material that is resistant to paint and solvents, in order to enable use in a coating agent pump.

With regard to the cross section of the annular sealing element, there are many possibilities within the scope of the disclosure. Preferably, however, the cross-section of the annular sealing element is angular, especially rectangular.

With regard to the cross-section of the annular pretensioning element, it should be mentioned that it is preferably a round cross-section, in particular a circular cross-section.

The disclosure also offers the advantage that the annular sealing element can be replaced independently of the seal base body and the pretensioning element, if this should be necessary, for example, due to wear.

Furthermore, it should be mentioned that the sealing element preferably protrudes radially inwards from the seal base body to form a seal, provided that the seal is fixed in a cylindrical running surface and presses sealingly on the outer surface of a movable piston. In the reverse arrangement of the seal in the outer lateral surface of a piston, on the other hand, the sealing element protrudes radially outwards from the seal base body.

It should also be mentioned that the seal according to the disclosure preferably consists of very few parts. If there are two sealing elements in the seal base body, the seal according to the disclosure then consists of four parts, namely the seal base body, the pretensioning element and the two sealing elements. If there is only one single sealing element in the seal base body, the seal according to the disclosure preferably consists of exactly three parts, namely the seal base body, the pretensioning element and the sealing element.

Finally, it should be mentioned that the disclosure does not only claim protection for the inventive seal described above as a single component. Rather, the disclosure also claims protection for a coating agent pump with such a seal according to the disclosure.

For example, the coating agent pump may have at least one delivery piston which is axially displaceable in a hydraulic cylinder. The hydraulic cylinder can have an annular groove for the seal on the inside of its outer surface, whereby the seal according to the disclosure is inserted into this groove of the hydraulic cylinder. Further design details of the coating agent pump are described in the patent application WO 2015/144317 A1 cited above, the contents of which are therefore fully attributable to this description.

Figure 1:
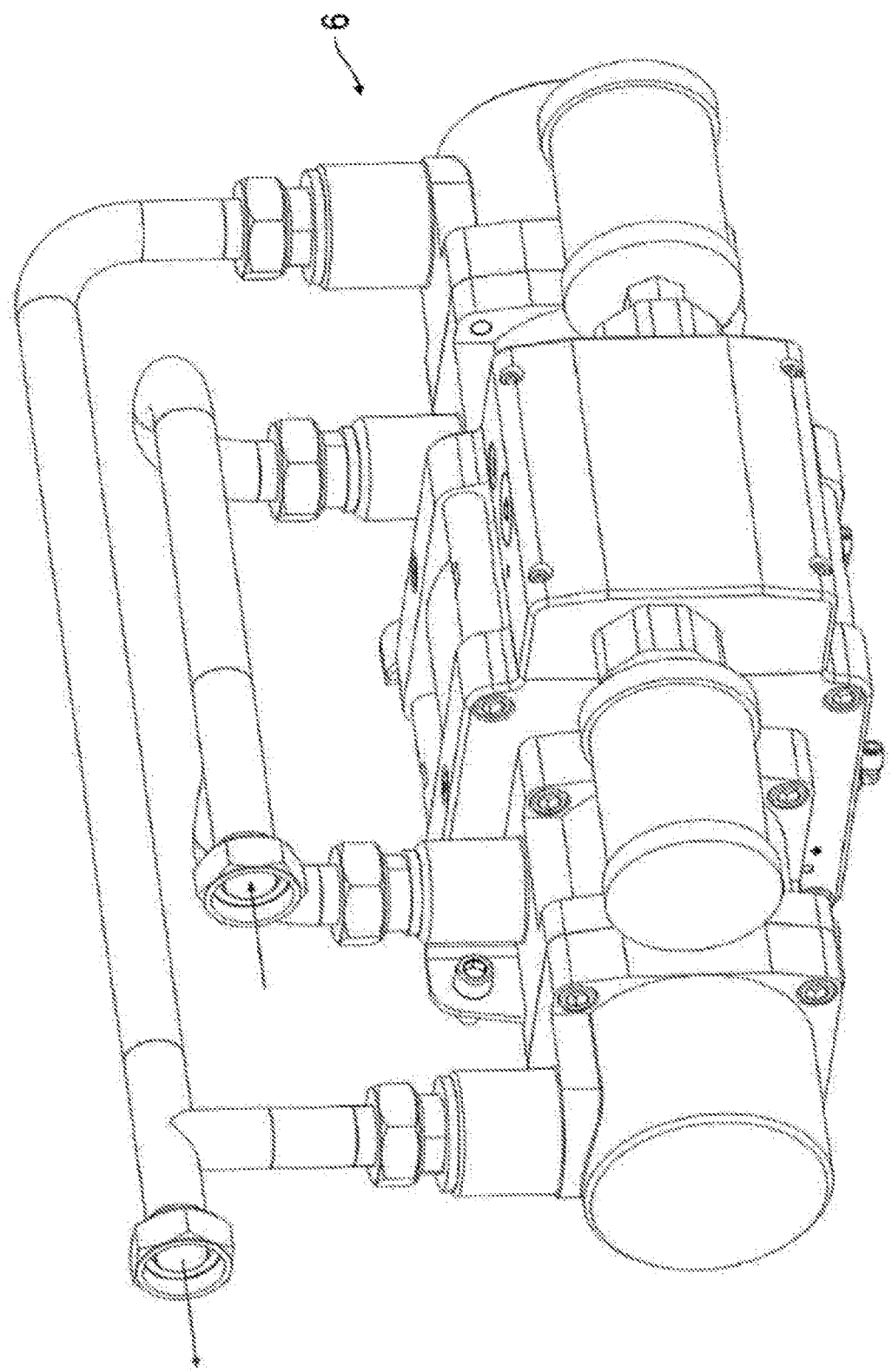
FIG. 1 a coating agent pump according to the disclosure in a perspective view.
Figure 2:
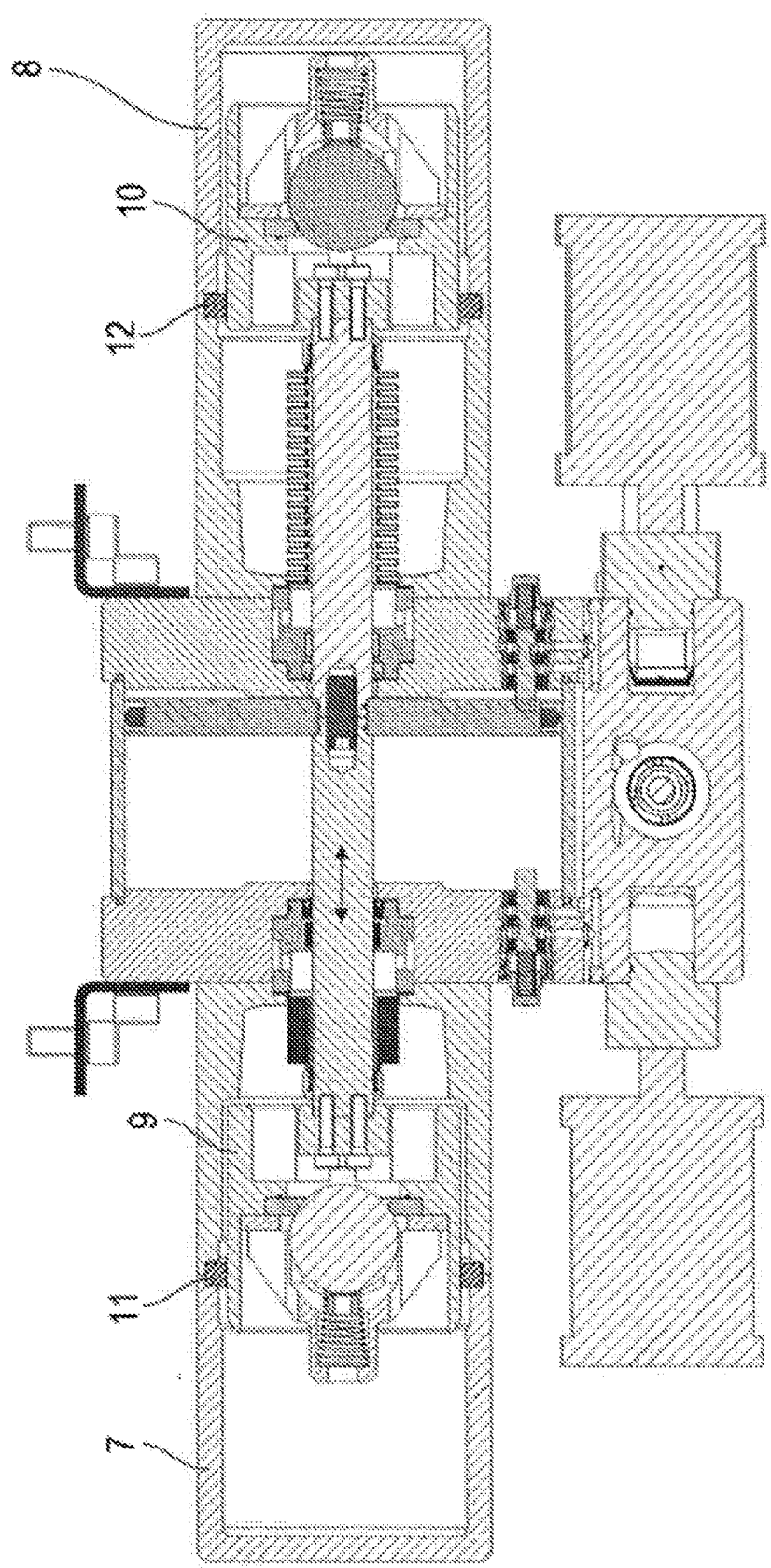
FIG. 2 shows a sectional view of the coating agent pump as shown in FIG. 1.

FIGS. 1 and 2 show different views of a coating agent pump 6 according to the disclosure, which has a largely conventional design and is described in US2017/0152841 A1, which is incorporated herein by reference with regard to its construction and function. The content of this patent publication is therefore fully attributable to the present description with regard to the construction and mode of operation of the coating agent pump 6.

In order to explain the disclosure, it is only necessary to mention that the coating agent pump 6 has two hydraulic cylinders 7, 8, in each of which a piston 9 or 10 is axially displaceable, as can be seen in FIG. 2.

To seal the pistons 9, 10 against the inner surface of the hydraulic cylinder 7 or 8, a seal 11 or 12 is provided in each case, which is inserted in a circularly surrounding receiving groove in the inner surface of the hydraulic cylinder 7 or 8. The seals 11, 12 are designed according to the disclosure and are described below.

Figure 3:
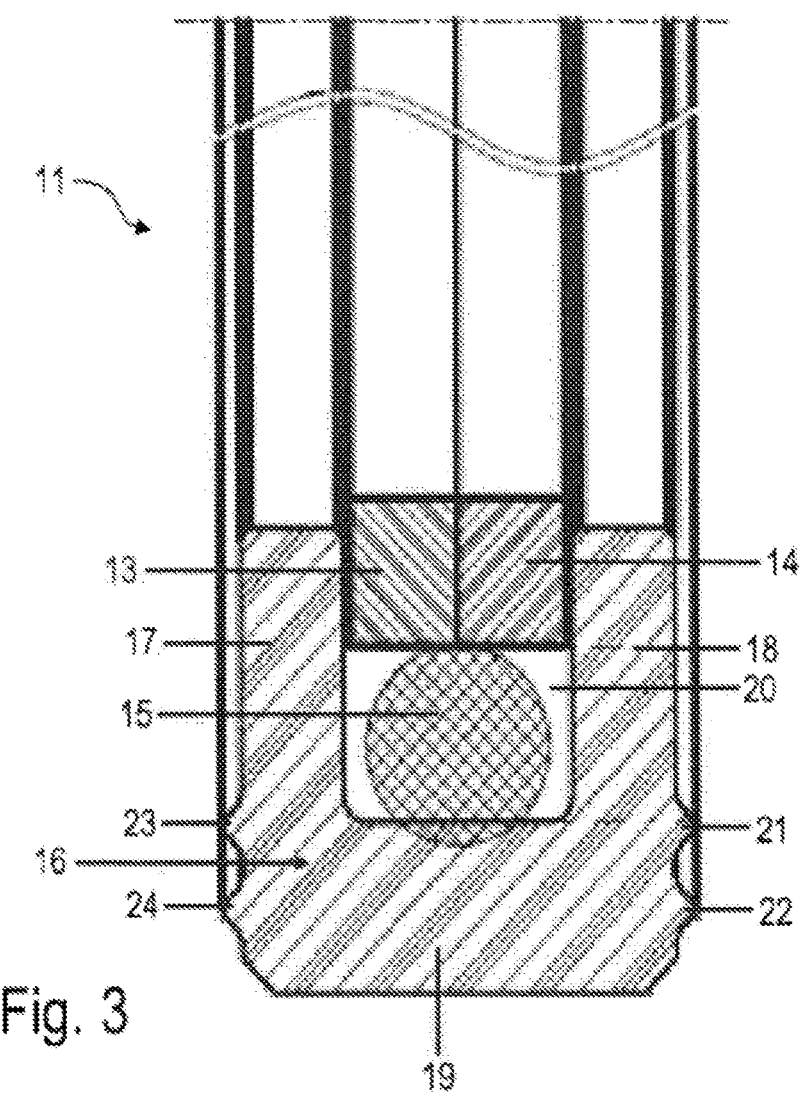
FIG. 3 a sectional view of the seal according to the disclosure.
Figure 4:
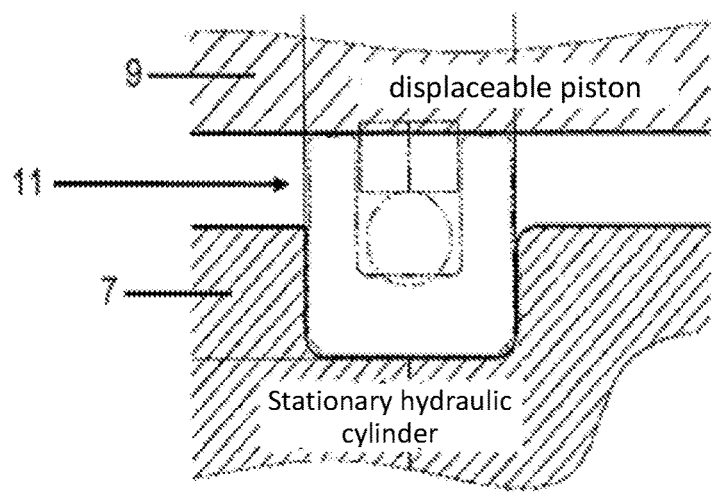
FIG. 4 shows a sectional view of the seal in accordance with the disclosure in a receiving groove of a hydraulic cylinder, FIG. 5A a perspective view of the annular sealing element of the seal of the disclosure in a perspective view with an oblique slit.

FIGS. 3 and 4 show only the seal 11, but the seal 12 is designed in the same way.

The seal 11 essentially consists of two ring-shaped sealing elements 13, 14, a pretensioning element 15 and a seal base body 16.

The seal base body 16 is essentially U-shaped in cross section and has two legs 17, 18 which run essentially radially and project inwards from an axially running base 19.

The two legs 17, 18 and the base 19 of the seal base body 16 enclose a receiving space 20, whereby the pretensioning element 15 and the two sealing elements 13, 14 are arranged in the receiving space 20.

The two sealing elements 13, 14 each have a rectangular cross-section and lie sealingly against the outer surface of the piston 9.

The pretensioning element 15, on the other hand, has a circular cross-section and acts jointly on the two sealing elements 13, 14, in that the pretensioning element 15 pretensions the two sealing elements 13, 14 radially inwards.

It should be mentioned here that the two sealing elements 13, 14 are made of a harder material than the pretensioning element 15, which is advantageous in order to achieve the lowest possible wear and a correspondingly long service life of the seal 11.

It should also be mentioned that the seal base body 16 has two axially protruding sealing lips 21-24 on each of its two axially opposite end faces in order to provide a static seal in the receiving groove for the seal 11.

Figure 5A:
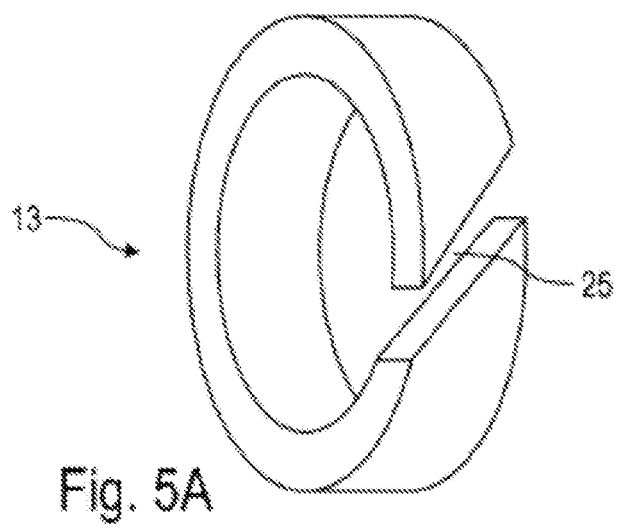
FIG. 5B is a variation of FIG. 5A with an axial slit.
FIG. 5C is a variation of FIGS. 5A and 5B with a stepped slit.
Figure 5B:
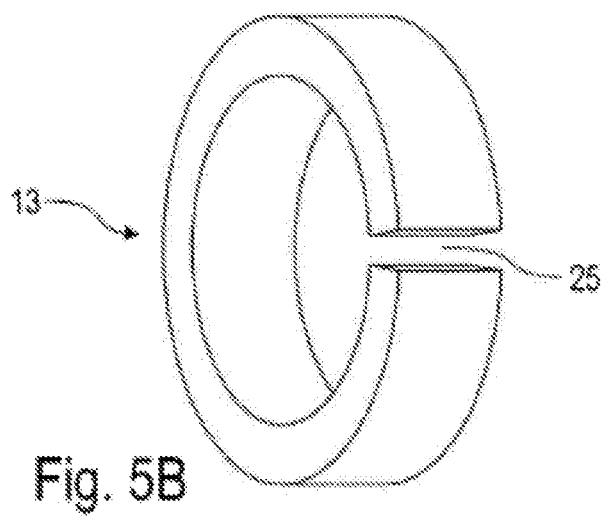
Figure 5C:
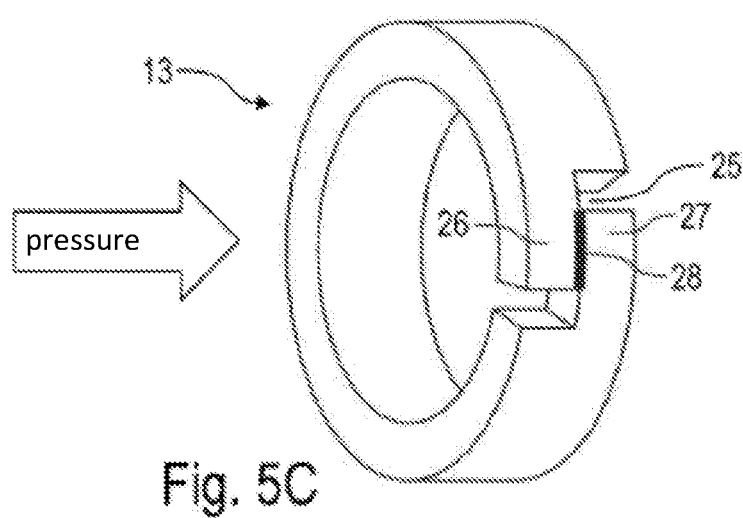

FIGS. 5A-5C show different disclosure variants for the sealing element 13, whereby the sealing element 14 can be constructed in the same way.

FIG. 5A, for example, shows a slotted version of sealing element 13 with a slit 25 that passes through the sealing element 13 in an axial direction and is inclined in the circumferential direction.

In the variant shown in FIG. 5B, the slit 25 runs exactly axially.

In the disclosure variant according to FIG. 5C, the slit 25 in the sealing element 13 has a stepped shape with two axially extending slit sections and a slit section extending in the circumferential direction in between. The slotted sealing element 13 can deform elastically during operation with its free ends 26, 27 depending on the pressure acting in the axial direction on the sealing element 13, which is shown by a block arrow in the drawing.

If there is no axial pressure load, there is a gap between the free ends 26, 27 of sealing element 13.

If an axial sealing load is applied, however, the two free ends 26, 27 of the slotted annular sealing element 13 are pressed together in the axial direction and then form a seal 28.

Figure 6:
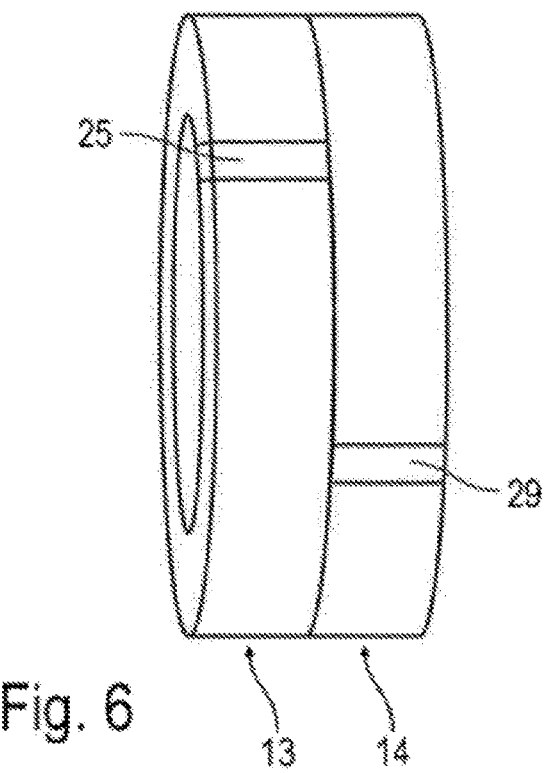
FIG. 6 is a schematic perspective view of two adjacent, annular, slotted sealing elements that are rotated relative to each other.

FIG. 6 shows a schematic diagram of the two sealing elements 13, 14 with the slit 25 in one sealing element 13 and a corresponding slit 29 in the other sealing element 14.

Here it can be seen that the two sealing elements 13, 14 are rotated relative to each other in such a way that the two slots 25, 29 are at different angular positions. This prevents a fluid (e.g. coating agent) from passing through the slots 25, 29 in the axial direction.

Figure 7:
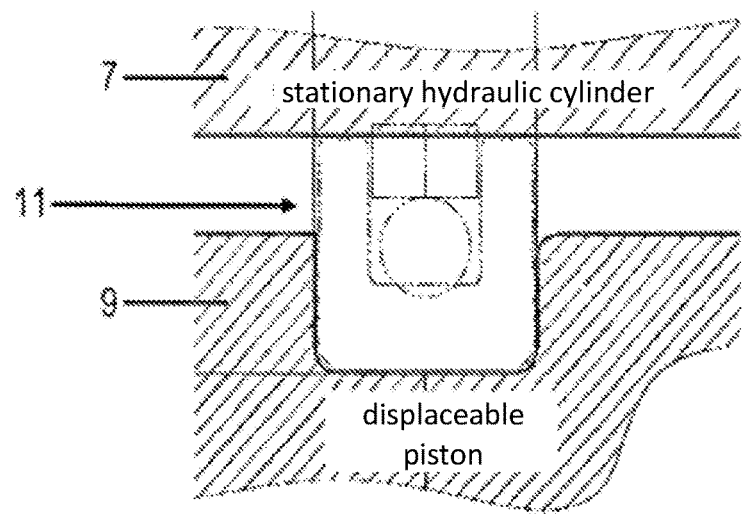
FIG. 7 is a variation of FIG. 4, the seal being located in an annular groove in the outer surface of a piston, and FIG. 8 a sectional view of a conventional seal.

FIG. 7 shows a modification of FIG. 4, so to avoid repetition, please refer to the above description of FIG. 4. However, this seal arrangement is reversed, i.e. the seal 11 is located in an annular groove in the outer circumferential surface of the piston 9 and is in sealing contact with the inner guide surface of the hydraulic cylinder 7.

The pretensioning element 15 pretensions the seal base body 19 radially inwards into the annular groove in the outer surface of piston 9.

In addition, the pretensioning element 15 is supported radially inwardly on the seal base body 16 and presses the sealing elements 13, 14 radially outward against the cylinder running surface of the hydraulic cylinder 7.

The disclosure is not limited to the preferred embodiments described above. Rather, the disclosure also comprises a large number of modifications and variants which also fall within the scope of protection. In particular, the disclosure also claims protection for the subject-matter and features of the dependent claims without the features of the claims referred to in each case and in particular also without the features of the main claim. The disclosure thus comprises various aspects of disclosure which are protected independently of each other.

The invention claimed is:

1. A seal comprising:
a) at least one annular sealing element, and b) at least one elastic annular pretensioning element, wherein the annular pretensioning element surrounds the annular sealing element and pretensions it, c) further comprising an annular seal base body which surrounds and holds the sealing element and the pretensioning element on both sides in the axial direction, the annular seal base body being substantially U-shaped in cross-section with two legs extending substantially radially and a radially outer base extending substantially axially, d) a guide cylinder including an annular groove arranged on an inside of a cylinder running surface of the guide cylinder, wherein the annular seal base body is arranged in the annular groove of the guide cylinder, and e) a piston displaceable in the guide cylinder, wherein the sealing element rests sealingly on an outer circumferential surface of the displaceable piston.

2. The seal according to claim 1, wherein the at least one annular sealing element sealingly rests on an outer surface of an axially movable rod.

3. The seal according to claim 1, wherein the at least one elastic annular pretensioning element surrounds the annular sealing element radially outwards and pretensions it radially inwards.

4. The seal according to claim 3, wherein the sealing element is made of a harder sealing material than the surrounding annular pretensioning element.

5. The seal according to claim 1, wherein the annular sealing element is made of a different sealing material than the surrounding annular pretensioning element.

6. The seal according to claim 1, wherein the annular sealing element is annularly closed.

7. The seal according to claim 1, wherein the annular sealing element is not closed in an annular manner but is interrupted by an axially continuous slit.

8. The seal according to claim 7, wherein the slit in the annular sealing element runs axially.

9. The seal according to claim 7, wherein the slit in the annular sealing element is inclined in the circumferential direction.

10. The seal according to claim 7, wherein the slit in the annular sealing element runs in a step-like manner with two outer axially running slit sections and a central slit section which runs in the circumferential direction.

11. The seal according to claim 7, wherein
a) the slit in the annular sealing element is step-shaped with two outer axially extending slit sections and a central slit section extending in the circumferential direction, and
b) the free ends of the annular sealing element leave a gap free in the region of the slit section extending in the circumferential direction without an axial pressure load on the seal,
c) the free ends of the annular sealing element in the region of the slit section extending in the circumferential direction lie sealingly on one another when the seal is subjected to an axial pressure load.

12. The seal according to claim 1, wherein
a) several annular sealing elements are provided, which lie next to each other in the axial direction in the seal base body,
b) the axially adjacent annular sealing elements are each not closed in an annular manner, but are interrupted by a slit, and
c) the axially adjacent annular sealing elements are rotated relative to one another, so that the slits of the axially adjacent sealing elements lie in different angular positions.

13. The seal according to claim 1, wherein the seal base body has at least one projecting sealing lip.

14. The seal according to claim 1, wherein the seal base body has at least one axially projecting sealing lip on each of its opposite end faces.

15. The seal according to claim 1, wherein the seal base body has at least two axially projecting and annular, concentric sealing lips on each of its opposite end faces.

16. The seal according to claim 1, wherein
a) the seal is a dynamic seal, and
b) the sealing element and the pretensioning element and the seal base body consist of an elastic sealing material.

17. The seal according to claim 1, wherein the sealing element and the pretensioning element and the sealing base body consist of a sealing material selected from a group consisting of the following material:
1) polytetrafluoroethylene,
2) polyethylene,
3) polyurethane,
4) Rubber,
5) Acrylonitrile butadiene rubber,
6) polyoxymethylene,
7) ethylene propylene diene rubber,
8) polyetherimide, and
9) Polyketone.

18. The seal according to claim 1, wherein the sealing element and the pretensioning element and the sealing base body consist of a sealing material which is resistant to paint and solvents.

19. The seal according to claim 1, wherein
a) the annular sealing element has an angular cross-section, and
b) the annular pretensioning element has a round cross-section.

20. The seal according to claim 1, wherein the annular sealing element is replaceable independently of the seal base body and the pretensioning element.

21. The seal according to claim 1, wherein the sealing element projects radially inwards from the seal base body.

22. The seal according to claim 1, wherein the seal consists of exactly four parts, namely the two sealing elements, the pretensioning element and the seal base body.

23. The seal according to claim 1, wherein the seal consists of exactly three parts, namely the sealing element, the pretensioning element and the seal base body.

24. A seal comprising:
a) at least one annular sealing element, and
b) at least one elastic annular pretensioning element, wherein the annular pretensioning element surrounds the annular sealing element and pretensions it,
c) further comprising an annular seal base body which surrounds and holds the sealing element and the pretensioning element,
d) a piston is displaceable in a guide cylinder, the piston including an outside lateral surface with an annular groove, wherein the seal base body with the sealing element and the pretensioning element is arranged in the annular groove of the piston, and
e) the seal base body radially inward of the sealing element and the pretensioning element,
f) the sealing element rests sealingly on an inner cylinder running surface of the guide cylinder, g) wherein the at least one annular sealing element includes at least two annular sealing elements lying next to each other in the axial direction in the seal base body,
h) the axially adjacent annular sealing elements are each not closed in an annular manner, but are each interrupted by a slit, and
i) the axially adjacent annular sealing elements are rotated relative to one another, so that the slits of the axially adjacent sealing elements lie in different angular positions.

* * * * *